United States Patent [19]

Brown

[11] 4,088,237

[45] May 9, 1978

[54] STORAGE AND RETRIEVAL SYSTEM

[75] Inventor: William L. Brown, Easton, Pa.

[73] Assignee: SI Handling Systems, Inc., Easton, Pa.

[21] Appl. No.: 726,897

[22] Filed: Sep. 27, 1976

[51] Int. Cl.² .................................................. B65G 43/00
[52] U.S. Cl. ................................ 214/152; 214/16.4 A
[58] Field of Search .......... 214/16 B, 16.4 R, 16.4 A, 214/11 R, 16.1 CD, 152

[56] References Cited

U.S. PATENT DOCUMENTS

| | | | |
|---|---|---|---|
| 1,975,717 | 10/1934 | Harris | 214/16.1 CD |
| 2,096,958 | 10/1937 | Clerc | 214/16 B |
| 3,057,487 | 10/1962 | Martinez | 214/16.1 CD |
| 3,669,288 | 6/1972 | Young | 214/152 |
| 3,670,867 | 6/1972 | Traube | 214/16 B |

FOREIGN PATENT DOCUMENTS 1,157,071  7/1969  United Kingdom ........... 214/16.4 A

OTHER PUBLICATIONS

FMC P1/C Master by FMC pp. 39 & other side.

Primary Examiner—Lawrence J. Oresky
Attorney, Agent, or Firm—Seidel, Gonda & Goldhammer

[57] ABSTRACT

A system is disclosed for storing and select-goods in a warehouse including transferring goods from a receiving area to a particular location in a storage area in response to a computer command, moving some of the goods from said area to endless conveyor means in response to a computer command, selecting a particular quantity of specific goods off the conveyor means in response to a computer command, and placing the selected goods on a vehicle for shipment.

5 Claims, 6 Drawing Figures

STORAGE AND RETRIEVAL SYSTEM

BACKGROUND

Competitive systems in the form of a computerized warehouse are known. One such competitive system is available commercially under the trademark SI ORDERMATIC and is described in the October 1973 issue of Material Handling Engineering. The SI ORDERMATIC system includes a plurality of inclined storage bins and conveyors with a computer controlled release mechanism for each bin such as that disclosed in U.S. Pat. No. 3,416,644.

The storage and retrieval of goods used heretofore is inefficient from a number of viewpoints. There is a need for a system of storage and retrieval which is automatic, requires less labor, requires less space, results in less damage to goods, results in fewer errors, etc. The system of the present invention attains all of these desirable objects while being simple and reliable.

SUMMARY OF THE INVENTION

The present invention is directed to a system for storing and selecting goods in a warehouse and removing selected ones of said goods for shipment. The first step is to transfer goods from a receiving area to a specific location in a storage area in response to a computer command. An operator then communicates to the computer that the transfer has been performed. Then there is a movement of the goods from the specific location to an identified location on endless conveyor means in response to a computer command. An operator then communicates to the computer that the move has been performed. Then there is a selecting of particular quantities of specific goods off the conveyor means in response to a computer command. An operator then communicates to the computer that the selection has been performed. Finally, there is the placing of the selected goods on a vehicle for shipment.

The principal object of the present invention is a computer directed selection system whereby goods are stored on endless conveyors, automatically moved into position before a selector who selects the required cases and places them on a pallet or delivery cart which is then automatically transported to an assigned shipping station.

Another object of the present invention is an automatic system of storage and retrieval of goods which requires less labor, less space, results in less damage to goods, produces fewer errors than prior art systems, while being more reliable.

Other objects and advantages will appear hereinafter.

For the purpose of illustrating the invention, there is shown in the drawings a form which is presently preferred; it being understood, however, that this invention is not limited to the precise arrangements and instrumentalities shown.

Figure 1:
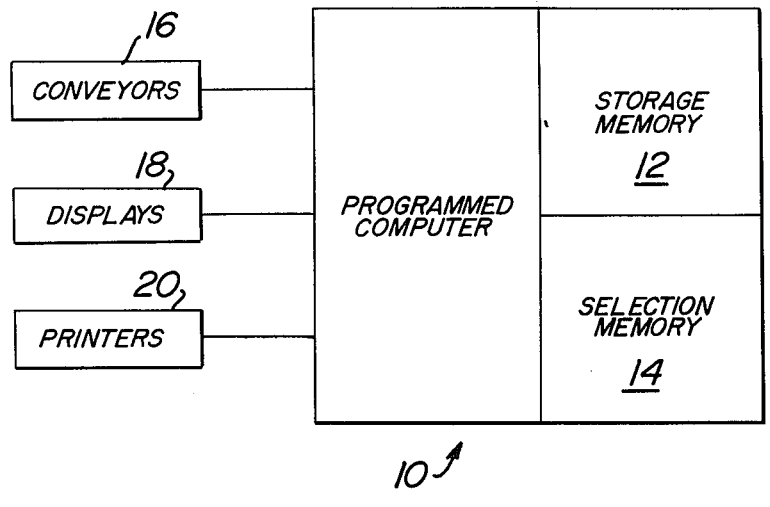
FIG. 1 is a block diagram of a programmed computer and associated components controlled thereby.

Referring to the drawing in detail, wherein like numerals indicate like elements, there is shown in FIG. 1 a programmed computer 10 having a storage memory 12 and a selection memory 14. The programmed computer 10 is coupled to each drive motor on a plurality of endless conveyors 16, displays 18 and printers 20.

Figure 2:
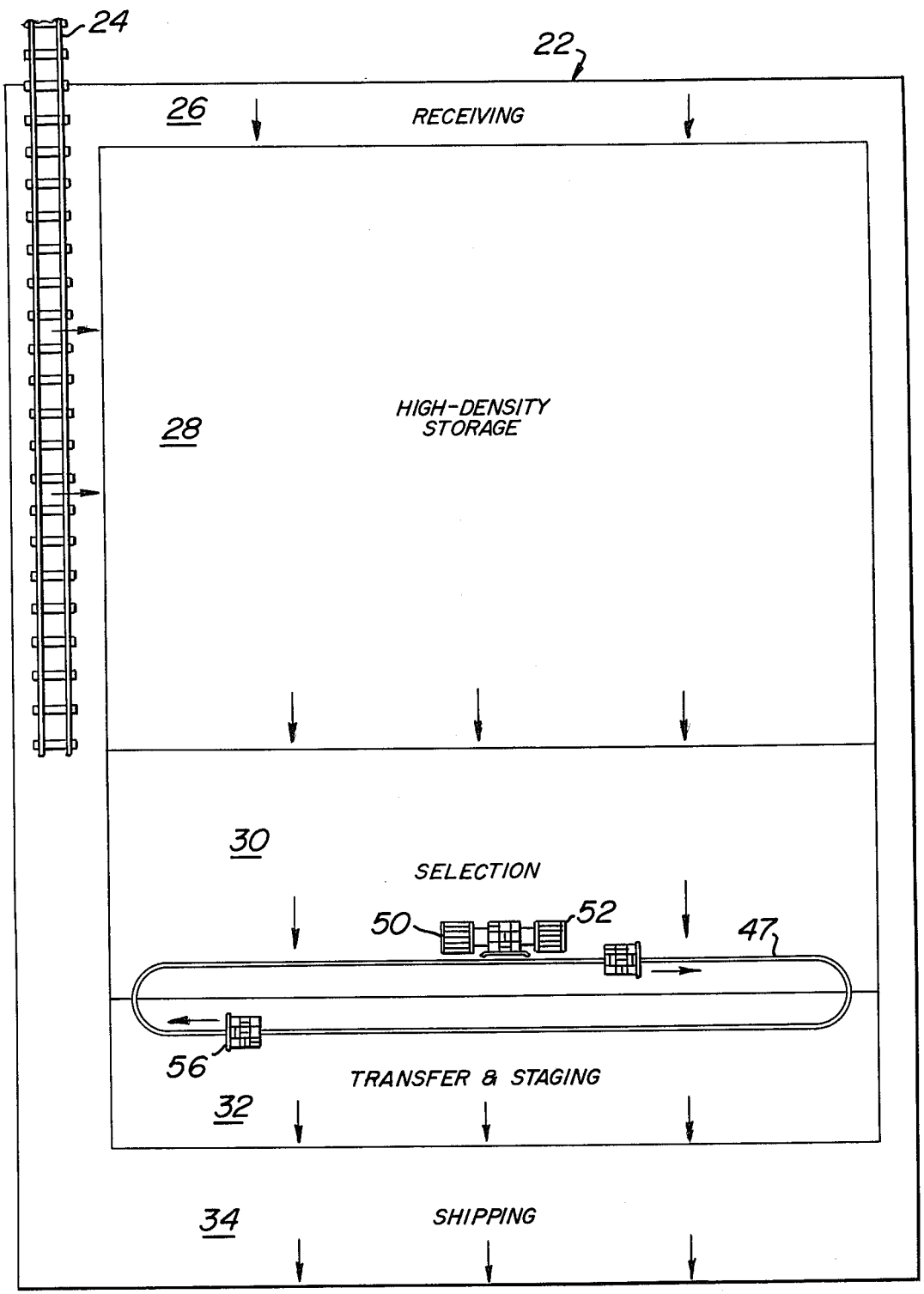
FIG. 2 is a diagrammatic plan view of a warehouse in accordance with the present invention.
Figure 4:
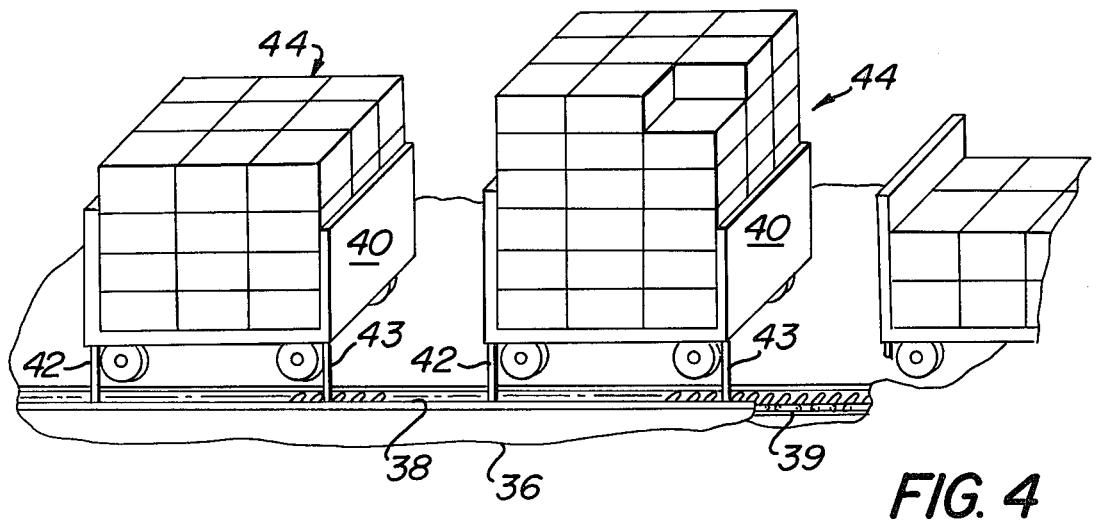
FIG. 4 is a partial perspective view of a portion of the conveyor shown in FIG. 3.

In FIG. 2, there is illustrated a diagrammatic plan view of a warehouse in accordance with the present invention. The warehouse 22 is located alongside tracks 24 and is provided with unloading ramps for unloading of trailer trucks. Goods are received in the receiving area 26 in the form of pallet loads or are palletized on the dock. The goods flow from the receiving area 26, to a high density storage area 28, to a selection area 30, to a transfer and staging area 32, to a shipping area 34 under computer control. The identity of the pallet loads received at the receiving area 26 are communicated to the storage memory 12 of the computer 10 which assigns storage locations in the high density storage area 28. Area 28 need not be high density but instead can be an automatic storage and retrieval stacker system.

The warehouse 22 is preferably constructed so that the floor to ceiling height will permit the stacking of pallet loads one above the other in storage bins or cubicles from floor to ceiling. A suitable floor to ceiling height at area 28 is 30 feet. The storage bins in area 28 are arranged in rows so as to provide aisles through which fork lift-type trucks may move the transferring the pallet-type loads from the receiving area 26 to the storage area 28. As a pallet load is placed in a selected bin in area 28 under instructions from the computer 10, the operator of the fork lift-truck communicates to the computer by a portable radio or some other means that the command has been performed, namely a particular pallet has been placed in a particular identified bin in storage area 28.

Figure 3:
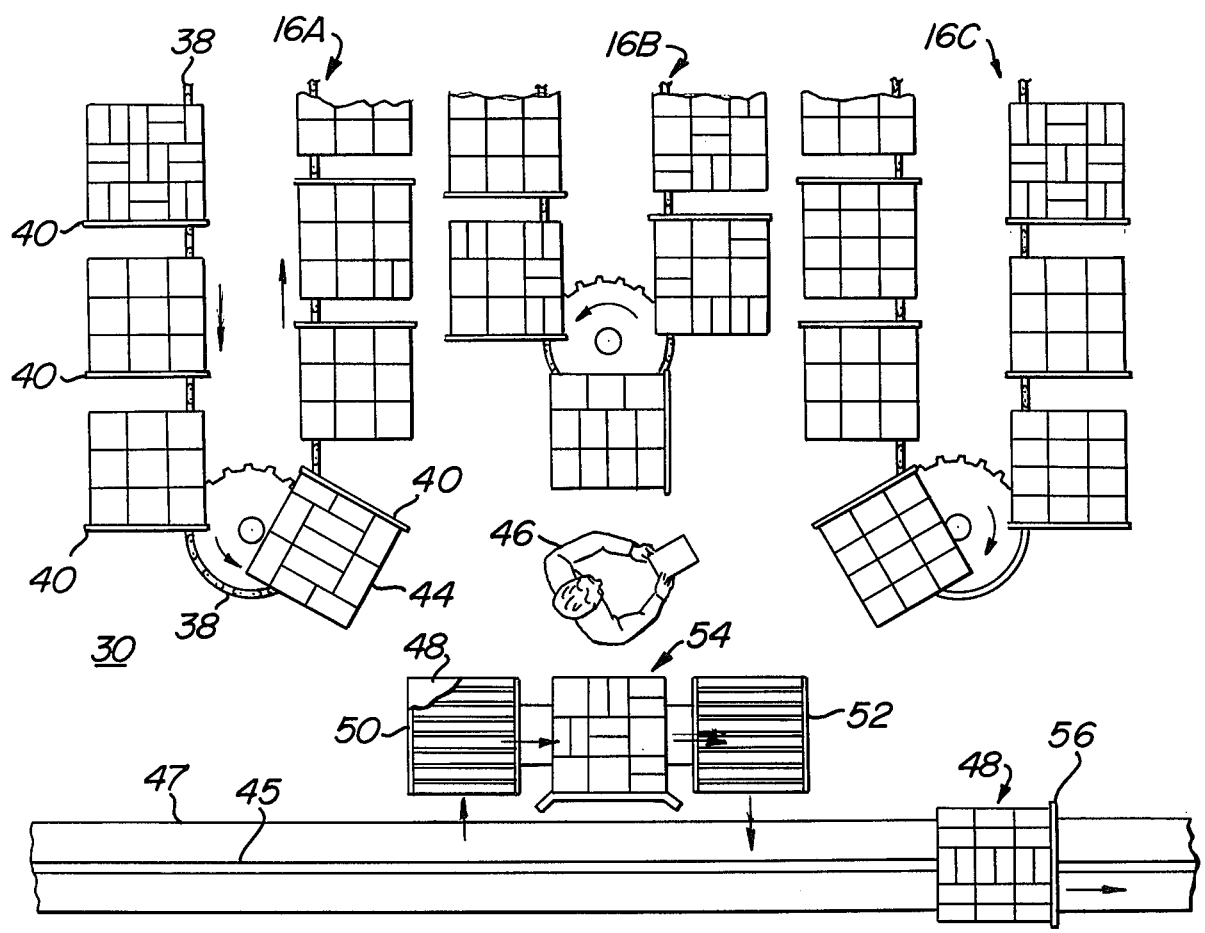
FIG. 3 is a partial plan view of an operator selecting goods off a conveyor and adjacent components of the system.

The selection area 30 is provided with a plurality of parallel endless conveyors designated 16a, 16b, 16c, etc. The conveyors are preferably arranged in groups of three so that three conveyors may be unloaded by a single operator 46 at one end thereof as shown in FIG. 3. Each of the conveyors is identical. Hence, only conveyor 16A will be described in detail.

The endless conveyor 16A includes a main slot 38 defined by channels on the floor 36. Below the slot and between the channels, there is provided a motor driven conveyor 39. The conveyor 39 is selectively or fixedly coupled to the carts 40 by a tow pin 42 on the front end thereof. A shorter guide pin 43 on the rear end of the carts also extends into the channel. The pins 42, 43 are disposed to one side of the longitudinal axis of the carts 40 to minimize the turn radius at the ends of conveyor 16A. Each tow pin 42 extends into the slot and is in contact at its lower end with the conveyor 39. Excluding cart 40, the conveyor 16A is old and well known to those skilled in the art. Representative conveyors are disclosed in U.S. Pat. Nos.: Re. 25,723; 3,295,462; 3,281,070; 3,262,397, etc. Each of the carts 40 is provided with a pallet load 44 of goods to be unloaded by the operator 46 and arranged on a pallet 48 in accordance with an order selection process to be made clear hereinafter.

Figure 5:
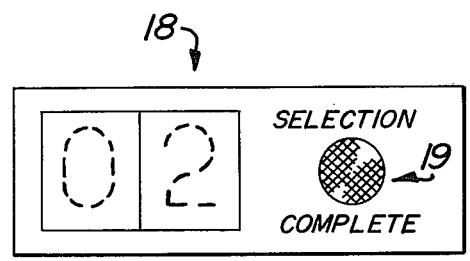
FIG. 5 is an elevation view of a display for instructions to the selecting operator.

The location and load of each cart 40 on each of the conveyors 16A, 16B, 16C, etc. is known to the computer 10. The number of carts 40 preferably exceeds the number of different goods so that some carts 40 will be empty. Fast moving goods will appear on more than one cart or on carts larger in size than those used for slow moving goods. An incoming order for selected goods from the high density storage area 28 and the conveyors 16 are programmed into the computer 10. The computer 10 stops each of the conveyors 16A, 16B, 16C with a predetermined one of the carts 40 in a disposition opposite the operator 46. Adjacent each of the conveyors 16A, 16B, 16C, etc. is a digital display 18. A typical display is shown in FIG. 5. The display 18 tells the operator 46 to take off a predetermined number of goods from the pallet load 44 on the cart 40 opposite him. After the operator has selected the predetermined number of goods, he pushes the completion button 19 thereby telling the computer that this portion of the order has been completed. The goods removed from the cart 40 are placed by the operator 46 onto the pallet 48 at work station 54 thereby assembling an order.

When the pallet 48 is assembled, operator 46 transfers it to conveyor 52, transfers an empty pallet from conveyor 50 to load station 54, and signals the computer 10 to dispatch a vehicle 56 and another empty pallet along the endless track 47 to the conveyor 50. From the conveyor 52, the fully loaded pallet 48 is transferred onto the vehicle 56.

At the start of every day, there is an empty pallet 48 at load station 54 and an empty pallet 48 at conveyor 50. When the operator has placed all the cases requested by the computer on the pallet 48 at station 54, he presses a switch which transfers the assembled pallet 48 from station 54 to conveyor 52 and the empty pallet 48 from conveyor 50 to station 54. This action also sends a signal to the computer that the conveyor 50 is empty and ready to receive a partial pallet or an empty pallet. The computer first checks to see if the assembled pallet is completed (full) or partial (must have additional cases added by another operator). If it is a partial, the computer waits until the next operator to select for that pallet is requesting a pallet. It will then check to see if a previously assembled partial pallet is waiting to be transferred. If there is, then the computer will cause a vehicle 56 to bring the partial pallet to the conveyor 50 and transfer the partial pallet onto conveyor 50. The vehicle 56 will move to exit conveyor 52 and transfer the partial onto the vehicle 56 for transfer to the next operator. If there is no partial waiting, the computer will call for the next vehicle from the parking lot to stop at the entrance of conveyor 50, transfer the empty pallet, move the vehicle 56 to conveyor 52, and transfer the partial onto vehicle 56 for transfer to the next operator. If the assembled pallet 48 is complete, the action is the same except the computer immediately calls for the previous partial of empty pallet if there is no partial pallet waiting and transfers the completed pallet to shipping. No pallet, complete or partial can be transferred out of conveyor 52 until the vehicle 56 has first deposited a partial pallet or empty pallet 48 onto conveyor 50.

Figure 6:
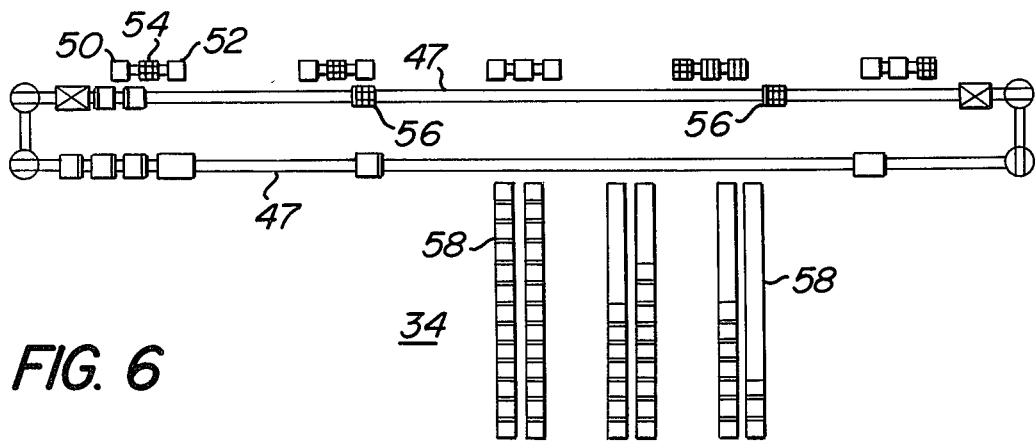
FIG. 6 is a diagrammatic plan view of the transfer and staging components.

The vehicles 56 are preferably of a known type as shown in U.S. Pat. Nos. 3,818,837 and 3,356,040 wherein they have a drive wheel in contact with a rotating drive tube 45. Thus, the vehicles 56 need not be described in detail. As shown more clearly in FIG. 6, the vehicles 56 travel around the endless track 47 to a position wherein they pass alongside the shipping conveyors 58. The fully loaded pallet 48 is transferred off the vehicles 56 onto one of the shipping conveyors 58 for loading onto a vehicle such as a trailer truck. The particular one of the shipping conveyors 58 for receiving the fully loaded pallet 48 is controlled and assigned by the computer 10.

As orders are selected and pallets on the carts 40 are depleted, the computer memory 14 keeps track of the quantities remaining on the carts 40 and through the printer 20 issues orders for replenishment. The replenishment instructions are in printed form for transmission to operators of the fork-lift trucks in the high density storage area 28. The instructions tell a particular fork-lift operator the identity of the pallet load and its location in area 28 as well as the particular conveyor such as conveyor 16A which is to receive the pallet load. After the fork lift operator signals the computer that he is ready, the computer 10 stops the conveyor 16A at a predetermined location so that the next discrete empty cart 40 will be as close as possible to the fork lift operator. After the fork lift operator places the pallet load on cart 40, he signals the computer which stores this information in its memory. Since nothing is exhibited at display 18 when the conveyor is stopped for replenishment, operator 46 does not remove any goods from the cart 40 in front of him at this time.

When the fork-lift truck operator has completed his instructions this is communicated to the computer 10 in any convenient manner such as by a portable radio signal. At all times, the storage memory 14 of the computer 10 maintains in its memory the exact location of each pallet load and the identity of the particular goods involved. Everytime the truck operator places a pallet load on one of the carts 40 of the conveyors 16, he also retrieves an empty pallet from one of the carts 40 and communicates completion of such task to the computer.

The size of the computer 10 may range from a micro processor to a large general purpose computer system. The choice of the particular type of computer will vary due to a variety of factors including the degree of the total system that is to be implemented, the volume of data that is required for a particular installation, the concurrent use of the computer system for other applications, etc.

The computer 10 preferably has the following characteristics: It should include instruction control logic, arithmetic logic units, the memory referred to above with provision for stored programs, direct access storage sub-systems, input/output controls for peripherals such as card readers, tape readers, printer terminals, etc. Also, the computer should have communication capability for terminals, controllers, interface with other computers, etc. If desired, the computer should have the ability to be used with other computers as a dual system or multiplexed system.

The computer 10 should be adapted to perform the following functions which may be readily programmed by anyone skilled in the art. The computer 10 should be able to check purchase order for goods when they are received in area 26 and compare the goods with the items purchased and the quantities. Thereafter, the computer 10 should be able to assign a specific pallet to a specific location in storage area 28 and enter into inventory in its memory the product code, product description, product quantity and the date.

The computer 10 should be able to print reports with respect to receipts of goods, accounts payable and the inventory on hand. Incoming orders are also identified in the memory by data including invoice number, volume, number of pallets, etc.

In connection with sequencing for selection of goods, the computer should be able to perform the function of checking its inventory, checking back orders for items not in stock, deducting from total inventory, checking the reorder point for particular goods, and checking the reorder quantity of particular goods.

The computer should be capable of performing the function of determining pallets and their selection schedule with data as to the volume of particular items at picking stations and provide for multiple selection of partial pallets. The computer should be able to perform the function of dividing orders into the endless conveyors 16A, 16B, etc. and issue printed instructions with respect to such orders. The computer 10 should perform the function of preparing reports on invoices, shipping manifests, purchase orders, inventory of specific items on a specific cart 40 as well as the total inventory on all carts 40 by item, and inventory in storage area 28 of a particular item.

For each of the operators 46, the computer 10 should be able to perform the functions of determining the next order to be processed with first priority going to partial pallets and then to full pallets. For each of the endless conveyors, the computer should be able to perform the function of moving the next cart 40 into position and signaling the quantity to be selected by operator 46. Upon receiving a signal from button 19 indicating completion of a selection, the computer removes the quantity signal and moves the next cart 40 into position with a repeat of the signal indicating the quantity to be selected.

The operator 46 is provided with a signaling means for communicating to the computer the inability to comply with the instructions on display 18. If the computer 10 instructs the operator to remove three cases from the pallet load on a particular cart 40, and there is only one such case on the cart 40, it is necessary for the operator 46 to communicate a short signal to the computer and the quantity involved. The signaling means is preferable in the form of two footpedals, one to indicate a short and the other to indicate the quantity of the shortage. The computer 10 should be capable of receiving such short signal and determining if another pallet of the same item is on the endless conveyor, rectify its memory with respect to the short pallet, be capable of adding to a backorder memory, and correct its inventory memory.

When the last item of an order has been selected, the computer should be able to check the status of other endless conveyors, activate a signal of selection complete, and start the next order. Since the operator 46 never knows that an order is complete, it is essential for the computer to so advise him via display 18. Also, when the operator 46 has assembled a complete pallet 48, he closes a switch or other signaling means to inform the computer that he has a complete pallet for transfer to the shipping area.

Upon receiving a signal that a complete pallet 48 is ready, the computer 10 must be capable of transmitting instructions for dispatching a vehicle 56 with an empty pallet 48 along the endless track 47 to the conveyor 50, causes transfer of the empty pallet to conveyor 50, moves the vehicle 56 to conveyor 52, causes transfer of the loaded pallet 48 onto vehicle 56 for transfer of the loaded pallet 48 to another station or to a shipping conveyor 58.

The computer 10 is capable of performing the function of selecting the particular shipping conveyor 58 for receiving the loaded pallet 48 and stops the vehicle 56 at that location. When the inventory on a cart 40 reaches zero, the computor must be able to perform the function of entering the identity of the specific cart in its empty cart memory and use the next cart 40 with the same item for succeeding demands in completion of an order. With respect to replenishment of the carts 40 on the endless conveyors 16, the computer is capable of ascertaining from its memory if inventory is above a reorder point or below a reorder point. If the inventory is below a reorder point, replenishment is accomplished by printing of instructions to the fork-lift type operators as described above and must be capable of receiving the two types of signals from such operator with respect to completion of a task and removal of an empty pallet. The computer 10 is also capable of searching its inventory memory so as to sequence the oldest items first when processing an order.

In connection with replenishment, the computer must be capable of operating in a manner so that the endless conveyors are stopped, and remain stationary until receiving a signal that a pallet load has been added to one of the carts 40. Thereafter, the computer should be capable of moving the conveyor 16 until an empty pallet is opposite the fork-lift type operator and then stop the conveyor 16. Subsequent movement of the conveyor 16 should not take place until after the fork-lift type operator has communicated to the computer that an empty pallet has been removed. The identity of the goods added by the fork-lift type operator to the specific cart 40 is also introduced into the inventory memory of the computer.

The computer must be capable of performing the function of inventory control with print-out on demand with respect to inventory in storage area 28, inventory on the endless conveyors, total inventory by item and age, etc. Where the inventory is below a reorder point, the computer will print-out a purchase order for purchasing replenishment supplies by identity of goods and quantity of goods.

The driverless vehicles 56 are each stored with an empty pallet in one or more parking lots and due to their construction will commence moving along track 47 by contact between their drive wheel and drive tube 45. The computer 10 must be capable of issuing signals to release the leading vehicle 56 from the parking lot. The vehicle 56 will automatically stop at conveyor 50, deposit an empty pallet, then move to conveyor 52 to pick up the assembled pallet.

The computer must be capable of issuing signals to release the vehicle 56 at each of conveyors 50, 52 and to activate a stop mechanism at any selected one of the conveyors 58. If no vehicle 56 is released from the parking lot, the computer must be capable of sounding an alarm or otherwise generate a signal to initiate compliance with its signal to release the next vehicle 56. When the pallet load of selected goods on vehicle 56 are to be tied, the computer must be capable of issuing a signal to stop the vehicle 56 at the tying station immediately downstream of conveyor 52 and activate the typing apparatus which thereafter will release the vehicle for dispatch to one of the conveyors 58.

The operator 46 who is selecting the goods has no paperwork. The operator 46 never sees an order for goods and hence does not have to make any decisions. The computer 10 by way of conveyors 16 brings the goods to the operator. The computer 10 communicates how many containers of goods are to be removed from a particular pallet load 44 which at that time is stationary in front of the operator 46 until the operator pushes the completion button 19 on the associated display 18. Since the operator 46 functions in a small area, the working conditions at that small area may be made conductive to high productivity and more attractive than a conventional warehouse by providing air conditioning, carpets on the floor, background music, etc.

The system of the present invention involves significantly less labor. There is no walking by any of the personnel. Cases are handled only once from pallet load 44 to pallet 48. Replenishment is by full pallet only. There is no paperwork that is filed. Any paperwork in the form of printed instructions to the fork-lift truck operators is expendable. Pallets are staged and transferred to the shipment area 34 automatically. At the staging operation, the pallet loads may be tied by conventional equipment for shipment. No checking is required.

The system of the present invention utilizes substantially less space. There are no aisles in the selection area 30. In a preferred embodiment, selection is accomplished on two levels on above the other. Reduced staging is required at the shipping area 34 and at the receiving area 26.

There is less damage to the goods due to the smaller amount of manhandling. The pallet loads are handled gently and are tied before transfer and shipping. There are few errors since all carts 40 are under direct control of the computer 10. The reduced chance of error is a direct result of fewer handlings, fewer pallet moves and fewer decisions. No labels are required for application by personnel. The hardware is simple and utilizes conventionally available equipment. Everything is installed above floor level so that there are no pits or trenches, no complicated mechanisms, no field welding, and easy maintenance.

The present invention is particularly adapted for use in warehousing pallet loads of goods in cases or packages with retrieval being pursuant to an incoming order. For example, a wholesale or chain store warehouse may store pallet loads of case goods in the warehouse 22 and on demand from its various customers or stores cause the pallet loads to stop in front of operators who select the required cases for each order or store on signal from a computer. A case is only handled once, namely when it is removed from a cart 40 by operator 46. The present invention uses a fewer number of square feet as compared with conventional or competitive systems while requiring substantially fewer personnel than conventional or competitive systems. At the same time, the efficiency in cases per man hour handled is substantially greater than that of conventional or competitive systems.

The present invention may be embodied in other specific forms without departing from the spirit or essential attributes thereof and, accordingly, reference should be made to the appended claims, rather than to the foregoing specification as indicating the scope of the invention.

I claim:

1. A method of storing goods in a warehouse and removing selected ones of said goods for shipment comprising:
   (a) transferring goods in the form of a pallet load from a receiving area to a specific location in a high density storage area in response to a computer command and then communicating to a computer that the transfer has been performed, storing the identity and location of said goods in the memory bank of the computer,
   (b) moving some of said goods in the form of a pallet load from said specific location to one of a plurality of endless conveyors in response to a computer command and then communicating to the computer that the move has been performed, storing the identity and location of the moved goods in the memory bank of the computer,
   (c) selecting a particular quantity of specific goods off said endless conveyors in response to a computer command then communicating to the computer that the selection has been performed, storing the identity of the selected goods and the identified location on said conveyors in the memory bank of the computer,
   (d) placing the selected goods directly on a pallet at said selecting area, and
   (e) moving the pallet as loaded in accordance with step (d) to a shipping area by means of an endless vehicle conveyor and by a command from the computer, whereby the goods are only handled once from pallet to pallet at said selecting area, and
   (f) dispatching said loaded pallets at said shipping area.

2. A method in accordance with claim 1 including stopping discrete vehicles of an endless conveyor by a signal from the computer while the selecting step is performed, said selecting step including producing a computer generated signal at the area where selecting is done to identify the particular quantity of goods to be selected from a predetermined one of the discrete conveyor vehicles.

3. A method in accordance with claim 1 wherein step (E) includes using a plurality of discrete pallet support vehicles guided along a loop conveyor between the shipping area and the selecting area of said endless conveyors.

4. A method in accordance with claim 3 including using pallet support vehicles guided along said loop conveyor to bring an empty pallet to a selecting area prior to removing a loaded pallet from the selecting area, removing an empty pallet at the selecting area from a pallet support vehicle before transferring a loaded pallet at the selecting area onto the vehicle.

5. A method in accordance with claim 3 including only partially forming a pallet load in step (d) at the selecting area of one of said endless conveyors, moving the partially loaded pallet along said loop conveyor to the selecting area of another endless conveyor and completing the pallet load, and then moving the completed pallet load to the shipping are as per step (e).

* * * * *